Patented June 6, 1950      2,510,262

UNITED STATES PATENT OFFICE 2,510,262

PROCESS OF MAKING IONIC MEMBRANES

Karl Sollner and Charles W. Carr, Minneapolis, and Harry P. Gregor, St. Paul, Minn., assignors to Regents of the University of Minnesota, Minneapolis, Minn., a corporation of Minnesota No Drawing. Application September 8, 1944, Serial No. 553,292

4 Claims. (Cl. 18—57)

This invention relates to the method of preparing membranes of porous character and more particularly to improved collodion membranes combining high absolute permeability and extreme ionic selectivity, and, optionally, without extreme ionic selectivity.

The classical investigations of Michaelis and collaborators on the dried collodion membrane as well as the work of other investigators have revealed the basic physico-chemical properties of membranes of porous character which are selectively cation permeable. Dried membranes of electronegative character prepared from suitable collodion were found by Michaelis, and also by Sellner and collaborators, to allow the cations of univalent strong inorganic electrolytes in solution to pass through, whereas these membranes are almost impermeable to anions. This ionic selectivity was shown by Sellner and collaborators to be due to the negative electrical charge of the membranes arising from the presence of dissociable acidic groups on the pore walls of the membrane. Sollner and collaborators have shown how to introduce such dissociable groups in the structure of membranes, primarily by oxidation. Abrams and Sollner have also shown that electropositive membranes similar to the activated dried electronegative membranes can be prepared by the adsorption of protamine on collodion.

These electronegative and electropositive collodion membranes, as heretofore produced, have certain unfavorable characteristics. From the physical standpoint, some types of these membranes are rough and irregular in configuration, fragile and lacking in durability. More important, the ionic selectivity and therefore the electromotive properties of these prior membranes, except in very dilute solutions, do not approach the theoretically possible maximum values as closely as is desirable. Their absolute permeability for non-electrolytes is very small, their ohmic resistance is very high, and correspondingly, the rate of exchange of the permeable ions through such membranes is extremely low, so as to make them impractical for use in commercial processes. The absolute permeability of these prior membranes is indeed so small that in many cases weeks must elapse before quantities have penetrated which can be analyzed by microchemical methods. Some of these difficulties have been overcome by Sollner and collaborators who prepared membranes having some satisfactory characteristics which were fairly well maintained over periods of use, but the absolute permeability thereof was still extremely low and, correspondingly, the ohmic resistance undesirably high.

It is an object of the present invention to provide new mechanically strong, smooth and regular membranes which allow the ready penetration of non-electrolytes of low molecular weight, high absolute permeability (having low ohmic resistance in electrolyte solutions) and optionally, extreme ionic selectivity for either anions or cations and of long life even on prolonged contact with electrolyte solutions. It is also an object of the invention to provide methods of preparing such new and improved membranes.

Other and further objects are those inherent in the products and methods herein illustrated, described and claimed.

In carrying out the invention there is utilized a membrane-forming material which is dissolved in a solvent or otherwise rendered fluid, for example, by heating, for preparing the membrane film on a solid forming surface. As the membrane-forming material there may be used any satisfactory film forming material of which there may be mentioned the cellulose nitrates, other cellulose esters, cellulose ethers, or mixtures of the same, cellulose, hydrocellulose such as denitrofied nitrocellulose and also other plastic film-forming materials such as urea-aldehyde, phenolic, acrylic-type resins, elastomers and many other such film-forming materials capable of being dissolved or otherwise rendered fluid. Collodion (nitrated cellulose) of either pure or technical grades is satisfactory.

The membrane is generated on the surface of a form by applying the dissolved or melted film-forming material thereto by dipping, pouring, spraying, or the like, until the desired thickness is built up. After evaporation of at least a part of the solvent, where used, or solidification by cooling, the so formed membrane is then treated by an agent in either liquid or gaseous phase, so as the introduce the ionic selective groups in the pores of the membrane (where ionic selectivity is desired), and is then dried, while still on the form, the drying being accomplished under controlled conditions of temperature and humidity, and while the membrane is held by the form to prevent shrinkage. The temperature of drying is not critical and is usually conveniently room temperature or slightly above. The humidity may range up to 80% relative humidity, 60% being preferred for best results. The membrane is then removed from the form, and is ready to be used, or it may optionally be further dried off the form and under the same controlled conditions of temperature and humidity as previously stated, or swelled by immersion in a bath of swelling agent of controlled composition for the particular film forming agent used, so as to vary the pore size and thereby alter the characteristics of the membrane.

The nature of the solvent used in preparing the solution of film-forming materials is selected to suit the particular film-forming material used. Mixtures of ethyl ether and ethyl alcohol are satisfactory where nitrocellulose is utilized. Likewise one or more layers may be cast on the form to provide membranes of varying thickness. The treatment to provide ionic selectivity depends upon whether an electronegative or electropositive membrane is desired.

The form on which the surface is generated may be a mandrel or other smooth surface, glass test tubes or polished stainless steel tubes being suitable. Bag shaped membranes are very satisfactory and large or small test-tube shaped mandrels prove very satisfactory, the film being formed on the entire outer surface. Where large tubular membranes are desired, there may conveniently be used a large tubular surface, optionally closed and rounded at the end. The membrane may be formed bag shaped in any desired diameter or length, and if it is desired to have both ends open, like a tube, the bag shape is subsequently cut off at one end and both ends, which are thus open, are fitted to tubular nipples by tying. For flat membranes, a large bag shaped membrane is first cast, treated in accordance with the present invention and then removed and cut off at the closed end and slit longitudinally, whereupon it may be opened out into a rectangular shape and made fast to a suitable rectangular carrying frame. Flat membranes may also be prepared by the use of flat surfaces, mercury, glass steel, etc., preferably lying horizontally. Provision must be made during drying or hardening to prevent the membrane from pulling loose from the edges of the casting plates or surfaces.

The details of preparation are further illustrated by the following specific examples which should not, however, be construed as limiting the invention:

A. PREPARATION OF ELECTRONEGATIVE MEMBRANES

A rotatably mounted shaft positioned horizontally was equipped with a variable speed drive for rotating the shaft at varying speeds in accordance with the membrane-forming operations hereinafter described. The shaft was equipped with a chuck for horizontally supporting casting mandrels that were placed one at a time on the shaft with the axis of the mandrel in alignment with the axis of the shaft. For the mandrels there were utilized Pyrex glass test tubes, 25 x 100 mm. size, each having a small hole in the bottom. The holes in the tube were sealed smoothly by allowing a drop of concentrated sugar solution to dry on the hole while the tubes stood in an oven. It may be stated parenthetically that the sugar is subsequently dissolved out, thus allowing a hole in the bottom of the mandrel for the introduction of liquid to facilitate removal of the finished membrane, as hereinafter described.

A 4% solution of collodion cotton, known in the trade as Baker Collodion Cotton, U. S. P. Pyroxilin, was dissolved in a solvent composed of equal parts of ethyl ether and ethyl alcohol. The solution was poured slowly from a narrow-mouth bottle over the Pyrex test tube mandrel as it was rotated, the drippings being caught in a beaker. It was found by experiment that the optimum speed of rotation was 15–18 R. P. M. The speed of rotation of the mandrel depends upon the size of the mandrel and the composition and concentration of the solution used, and is regulated so as to permit droplets of the film-forming material to drop off the mandrel as it is rotated. If the speed is too great, the drops of film-forming material that form on the under side of the mandrel as it is rotated do not drop off but spread and form ridges on the cast membrane. If the rotation is too slow, uneven spreading of the solution results. The particular speed suitable for any selected size of mandrel may be determined by simple experiment. In casting each membrane, the procedure was as follows:

The rotating mandrel was evenly covered with collodion solution. After the mandrel test tube had been rotated for three minutes, a second layer was added in the same manner as the first and after an additional three-minute period a third and final layer was put on. The tube was rotated for eight minutes additional and was then removed from the chuck and immersed in distilled water which was changed repeatedly. After thirty minutes of immersion the membranes were ready for oxidation in order to produce an electronegative character of the membrane.

The porous membranes thus prepared were oxidized by placing the membranes while still on the test tubes in a one molar aqueous solution of sodium hydroxide for varying lengths of time, as indicated by the tables given below. After superficial washing with distilled water they were then immersed in distilled water and allowed to stand for two or three hours. The membranes while still on the tube were then taken out of the water and dried in air for several hours while standing in an upright position. Under most conditions a drying time of five or six hours gives satisfactory results. During drying, the temperature of the air was about 25° C. and the humidity was not permitted to drop much below 25%. The drying was discontinued as soon as one of the membranes of the batch showed a crack. The cracked membrane was, of course, unsatisfactory but it served as a control indicating the completion of drying for the remainder of the batch. Where extremely uniform membranes are generated, the drying time may first be determined on a small size batch and then larger size batches dried under the same conditions for a time slightly less than that at which cracking developed in the test batch. For large scale operations the temperature and humidity of the room in which the operations are carried out are closely and accurately controlled so as to provide uniformity of conditions.

While drying, the membranes were prevented from shrinking in area due to the rigid support afforded by the mandrel, in this instance the test tubes, and they thus underwent what amounted to stretching in two dimensions. The loss of volume of the film on drying was compensated for by a decrease in thickness.

To remove the membranes from the mandrel they were immersed in water for one to two hours. This soaked out the dried plug of sugar in the bottom of the mandrel and permitted the water to enter between the mandrel and the film thereon from both ends, and thus facilitated removal. The opening from which the sugar plug was soaked out also served to break the suction that would otherwise form as the membranes were stripped off the mandrels. The soaking in water not only swelled the membranes slightly and made them less brittle, but also provided a lubricant for sliding the membrane off the glass or other mandrel surface. For easy handling during subsequent operations the membranes were tied securely with linen thread to nipples of glass tube having a size such as to fit neatly into the inside of the open end of the membrane bag. Until further used the membranes were kept in water to which a crystal of thymol had been added as a preservative. The thickness of the membranes so prepared was about $30\mu$.

It may be stated generally that oxidizing agents other than sodium or potassium hydroxide solution may be used, but offer no significant advantages as compared with the sodium hydroxide solution. Thus, the membranes may be oxidized with NaOBr as an oxidizing agent or by other liquid or gaseous oxidizing agents. Oxidation with NaOH or KOH, however, yields membranes of the highest absolute permeability.

Two sets of measurements were made to characterize the membranes prepared in accordance with this example. Measurements of the "characteristic concentration potential" were made to determine the ionic selectivity of the membranes, these measurements being carried out in accordance with the method described by Michaelis and collaborators, Biochem. Z., Berlin, 1925, 158, 28; 1925, 161, 47; 1925, 164, 23, utilizing 0.1 molar solution of KCl on one side of the membrane and a soltuion of 0.01 molar KCl on the opposite side of the membrane.

The magnitude of the characteristic concentration potential is a good measure of efficiency of the ion-selectivity of the membrane. Membranes which under the conditions of use are completely impermeable to anions and permeable to the cations yield a concentration potential of +55.1 millivolt (the theoretical maximum). For a membrane completely impermeable to cations the permeable to anions the value is −55.1 millivolts. Values lower than these maximums indicate a lesser degree of ionic selectivity, the "leak" of anions in the case of electronegative membranes or cations in the case of the electropositive membranes can be calculated from the potential measurements as pointed out by Michaelis.

For a measure of the absolute permeability of membranes, their ohmic resistance was determined in 0.1 molar KCl solution using the Kohlrausch bridge method with an alternating current of about 1000 cycles per second. The measurements were made after 30 minutes contact of the membranes with the KCl solution, though the resistance of the membrane still drops on longer immersion in the electrolyte solution. Resistance (ohmic value) gives a relative measure of absolute permeability for either cations or anions as the case may be. The ohmic resistance value is also a measure of the exchange rate of permeable ions through the membrane per unit of area per unit of time, for instance the exchange rate when the membrane is interposed between soltuions $NaNO_3$ and KCl. In determining the resistance of the bag-shaped membranes it was necessary to use special electrodes constructed and placed so that the current would pass in about equal density through the whole area of the membrane. The outside electrode consisted of a hexagonal cage 45 mm. wide and 120 mm. high supported upon thin glass rods and wound with platinum wire. The inside electrode was a platinum wire spiral wound around a glass rod. Both electrodes were platinized by electrolysis in 2 per cent chloroplatinic acid.

To make a measurement of the ohmic resistance, a membrane was filled with 0.1 molar KCl and clamped in position inside the cage electrode, which was immersed in a beaker filled with the same solution. The other electrode was then lowered to a fixed position into the inside of the membrane. The total resistance between the two electrodes was then measured. Next, the resistance of the system without the membrane was determined. Neglecting the resistance of the layer of solution replaced by the membrane, the difference in these two measurements can be taken as the resistance of the membrane. Since all of the membranes were of approximately the same effective area, (50 sq. cm.) the results of the resistance measurements are given below in the tables in ohms per membrane, as obtained experimentally.

The oxidation with sodium hydroxide not only activates the membrane but also to some extent weakens it, and if carried too far will finally destroy the membrane. Table I shows the effect of the time of oxidation in sodium hydroxide solution. In Table II are shown the results obtained with a number of membranes prepared with uniform time of oxidation but without rigid temperature control during the oxidation. The first eight membranes listed in this table were taken from eight different series and show the variations in properties which under these conditions may occur from one run to the next. The last five membranes in the table were prepared at the same time and they show the uniformity of charactistics of individual membrane specimens in one series wherein the conditions were uniform. By maintaining close control of the conditions of formation of the membrane, washing, oxidizing and drying, any desired characteristic may be obtained.

TABLE I

*Effect of the time of oxidation*

| Oxidation Time in 1 M NaOH | Concentration Potential .1 N KCl/.01 N KCl | Resistance .1 N KCl |
|---|---|---|
| | Mv. | Ohms per 50 sq. cm. |
| 4 min | 54.8 | 80 |
| 6 min | 54.6 | 22 |
| 8 min | 54.8 | 17 |
| 10 min | 54.5 | 8 |
| 12 min | 54.5 | 3 |
| 14 min | 54.6 | 2 |
| 16 min | 54.0 | 1.5 |

TABLE II

*Characteristic concentration potential and resistance (oxidized for 12 min. in 1 N NaOH at room temperature)*

| Membrane | Characteristic concentration potential 0.1 M KCl/0.01 N KCl (±0.1 mv.) | Resistance in 0.1 M KCl (±0.5) q |
|---|---|---|
| | mv. | Ohms per 50 sq. cm. |
| A | 54.5 | 11 |
| B | 54.5 | 10.5 |
| C | 54.6 | 2.5 |
| D | 54.2 | 3.0 |
| E | 54.8 | 6.0 |
| F | 55.1 | 1.0±0.2 |
| G | 55.0 | 0.5±0.2 |
| H | 54.9 | 0.5±0.2 |
| RI | 54.5 | 3.0 |
| RII | 54.8 | 3.0 |
| RIII | 54.7 | 3.0 |
| RIV | 55.1 | 3.0 |
| RV | 54.7 | 3.0 |

Table I shows that the "characteristic concentration potential" in all cases, with short as well as with long oxidation times, approaches the theoretically possible maximum of 55.1 mv. within one millivolt; the resistance of the membranes however decreases sharply with increasing time of oxidation. One is able to produce at will membranes having resistances of almost any desired magnitude. It may be stated parenthetically that it is difficult to make accurate measurements of ohmic values of less than half an ohm per 50 square centimeters. Excessively strong oxidation, obviously not only increases the number of pathways through the membrane as indicated by the low resistance of the membranes, but also brings about an increase in the size of some of the pores so that they permit the passage of some anions; the membranes become slightly anion "leaky" and the concentration potential is therefore slightly lowered. The strength of the membranes decreases with increase in oxidation time.

The water content of the membranes varies from 16 to 18 volume per cent. This compares with a water content of about 10.5 volume per cent of conventional dried membranes prepared in accordance with previous methods from the same collodion. The higher water content and great porosity of the membranes prepared in accordance with the present invention is believed to be one of the most important causes of their much increased absolute permeability as compared with membranes hitherto available. The membranes keep their properties for several months on contact with water without any significant deterioration. Their ionic selectivity slightly decreases on prolonged contact with electrolyte solutions.

The great absolute permeability of the membranes of the present invention is shown by the following experiment. In one such experiment a bag-shaped membrane, prepared in accordance with the present example, having resistance of 1 ohm in 0.1 normal KCl and having an active area of 50 square centimeters, was filled with 30 ml. of 0.1 normal NH₄Cl and placed in a tube containing 30 ml. 0.1 normal KNO₃ solution. After four hours the KNO₃ solution had become 0.02 normal in NH₄⁺ ion concentration. This represented an exchange of 0.9 milli-equivalent of cation during this period while less than 0.03 milli-equivalent of chloride ion (anion) "leaked" out of the KNO₃ solution, corresponding to an anion "leak" of 2%. These rates of ion exchange may be increased several fold by adequate stirring either by mechanical stirring or flow of the solutions past the membrane as in a counterflow apparatus. Membranes of slightly greater ohmic resistance show much less anion "leak," leakages of less than 1% being not uncommon. The relative amount of "leak" in more dilute solutions is always smaller. The "leakage" of bivalent anions in similar experiments was immeasurably low. A fair parallelism was found between the values of conductance (ohmic value) of the membranes produced in accordance with the present invention and their absolute permeability as measured by exchange rates.

The rate of cation exchange through the membranes of the present invention is about two to four orders of magnitude (100 to 10,000 times) greater than the rate of cation exchange reported by Michaelis and coworkers, J. Gen. Physiol., 1927, 10, 575, and Netter Arch. Ges. Physiol. (Pflüger's) 1928, 220, 107, and the "leakage" of anion is much smaller. One may therefore properly conclude that the absolute permeability and the ionic selectivity of the new membranes of the present invention is much greater than heretofore available.

The water permeability of the membranes produced in accordance with this example was also tested. For carrying out this test a solution of 0.2 molar sucrose was placed inside a mambrane of 3 ohm resistance in 0.1 normal KCl. The membrane connected to a rubber stopper carrying a capillary manometer tubing was placed in a beaker of water and the meniscus in the manometer was observed. After 24 hours the rise of the meniscus amounted to 100 mm. For the capillary used, this corresponded to a volume transport of 100 mm. water during this period. When this experiment was performed with a dried collodion membrane of the conventional type heretofore available, no water movement was observed even after several days.

The improvement that has been made in the electrical properties (ionic selectivity and absolute permeability) of the membranes produced in accordance with the present invention as compared with conventionally "dried" type membranes heretofore available is illustrated by Table III which shows a comparison of several kinds of frequently used "dried" collodion membranes and a membrane made in accordance with this example. The potentials and resistances were determined as heretofore described. The membranes were all of the same or nearly the same size; their thickness was 5–10μ, except for the membrane of this example which was 30μ. This table brings out clearly the advantages of the membrane prepared in accordance with the present invention as compared with conventional membranes heretofore available. Thus, in accordance with the present invention there may be prepared a membrane which combines extreme ionic selectivity with any desired resistance range from less than 0.5 ohm to several hundred ohms or even up to the resistance of prior membranes, i. e. in the range of 1000–1500 ohms per 50 square centimeters.

TABLE III

*A comparison of electromotive behavior and resistance of several kinds of conventional "dried" collodion membranes and membrane of Example A*

| Description of Membrane | Characteristic concentration potential 0.1 M KCl/0.01 M KCl | Resistance in in 0.1 M KCl | Remarks |
|---|---|---|---|
| | mv. | Ohms per 50 sq. cm. | |
| Mallinckrodt "Parlodion," commercial preparation | 25–40 | >10,000 | |
| Baker Collodion U. S. P., commercial preparation | 40–45 | >10,000 | |
| Schering-Kahlbaum "Celloidin" [1] | 40–53 | ~1,500 | |
| Crude collodion | 45–50 | ~2,000 | |
| Oxidized collodion, Baker Collodion U. S. P., oxidized with NaOBr | 50–55 | >10,000 | Resistance cannot be adjusted at will. |
| Oxidized collodion, Baker Collodion U. S. P., oxidized with NaOH | 50–55 | >10,000 | |
| "Oxidized" membranes, dried membranes oxidized with NaOBr. | 51–53 | ~1,000 | |
| Membrane of Example A | 54–55 | <0.5 to >100 | Resistance can be adjusted at will. |

[1] The concentration potential of membranes prepared from this collodion drops appreciably on prolonged contact with water or electrolyte solutions.

The membranes prepared in accordance with this example are useful in the electrometric titration of alkali ions and of $Mg^{++}$ and in the study of ionic permeability through negative membranes where it is possible by utilizing the membranes of the present invention to extend the investigations of graded cation selectivity and also to the handling of bivalent ions.

In accordance with this example electronegative membranes may be prepared which not only have a characteristic concentration potential within 1 millivolt of the theoretical maximum of +55.1 millivolts, but at the same time has an ohmic resistance in 0.1 molar KCl even less than 0.5 ohm, per 50 square centimeter. The resistance may be conveniently adjusted upwardly by variation in oxidation and/or variations in drying to any value above 0.5 ohm.

B. PREPARATION OF ELECTROPOSITIVE MEMBRANES

Three layer porous collodion membranes were cast on the outside of rotating mandrels (test tubes) in exactly the same manner as described in Example A for the preparation of electronegative membranes. For this purpose a 4% solution of collodion (Baker Collodion U. S. P.) dissolved in solvent composed of equal parts of ethyl ether and ethyl alcohol was used. After casting the three layers and after a preliminary drying of eight minutes, the test tube mandrels with the membranes still on them were immersed in distilled water which was repeatedly changed. Then the membranes were placed in a 2% solution of protamine sulphate which was buffered to pH 11 with a 0.025 molar sodiumborate—sodium hydroxide buffer composition. The membranes immersed in the protamine sulphate solution were placed in an ice box wherein a temperature of from 2° to 5° C. was maintained. After 48 hours they were taken from the protamine sulphate solution, thoroughly washed and dried for five hours in air at room temperature (20–25° C.) while still on the tubes. The drying may be continued for a longer period if desired. For optimum results (lowest ohmic resistance and maximum characteristic concentration potential) the membranes should be dried for 12 hours in moving current of air having a relative humidity of 60%; the temperature of the air was about 20–25° C. The membranes are then removed and the drying repeated for another 12 hours under the same conditions. By using lower humidity the membranes are more dense, i. e., they have a higher ohmic value, the characteristic concentration potential being about the same. Drying may be carried out at any temperature from 0° C. to 80° C. and even higher, and at relative humidities of any percentage up to about 80%. The same conditions of drying are applicable to membranes of Example A and generally.

In this example the tubes with the membranes still on them were then soaked in distilled water for several hours whereupon the membranes could be slipped off the tubes. Occasionally it was necessary to dip the membranes in a swelling medium, for example ethyl alcohol, for a few minutes to facilitate removal.

After the removal of the membranes from the tube they were fitted on glass rings by tying with linen thread for convenience in handling.

At this stage in the preparation the membranes did not have the optimum degree of ionic selectivity as determined by the measurement of the "characteristic concentration potential" between 0.1 molar and 0.01 molar KCl. Their absolute permeability at this stage is very great and their resistance in 0.1 molar KCl solution is so low as to be hardly measurable. These membranes are very desirable when dealing with electrolytes having large size anions or bivalent cations.

Further drying in air, as explained above, without support of the mandrel, resulted in membranes having a maximum degree of ionic selectivity obtainable with protamine now available. The drying was carried out at room temperature (20–25° C.) and at a humidity in excess of 25%. The membranes shrank slightly during this drying but were perfectly smooth and had the shape of the test tube mandrel on which they were formed.

The protamine treated collodion membranes so prepared were capable of storage for long periods either in the dry condition or in water to which a crystal thymol had been added as a preservative. The membranes frequently showed yellowish or brownish discoloration which, however, did not affect their properties or their usefulness.

During the casting of the porous membrane in the preparation of the electropositive type, it is desirable that the membrane should not be too dense, otherwise low concentration potentials of the finished membrane are obtained probably because many pores are too narrow to admit the protamine molecules. To obtain sufficient porosity with the particular brand of collodion used in this example, the amount of ethyl alcohol used in the collodion solution was made equal to or somewhat greater than the amount of ethyl ether. The membranes after drying should preferably have a thickness of 30–50 $\mu$.

While the protamine sulphate impregnating solution may be used in a concentration of 0.2 to 0.5% or less, more consistent and favorable results are obtained when using a protamine sulphate solution of about 2%. For optimum results the pH of the protamine solution should be controlled. In unbuffered solutions the pH of the protamine impregnating solution is sometimes changed by two units, due to the reaction of the alkali solution with the collodion. For optimum results the protamine impregnating solution should be buffered to the range of about pH 10.5 to about pH 11.5. When the solution is more alkaline than about pH 11.5 some weakening of the membrane occurs whereas when the protamine solution is below about pH 10.5 the adsorption of the protamine molecule by the membrane does not proceed as thoroughly and rapidly as frequently desired. By moderately oxidizing the membrane with the oxidizing agents described in Example A, prior to impregnation with the protamine solution, a somewhat less alkaline and even neutral protamine solution can be used. The buffered protamine solution may be used repeatedly because only a small amount of the protamine is adsorbed onto the membrane and the pH may be adjusted from time to time as necessary. The protamine solution should be kept at ice box temperatures (0° C. to 5° C.) continuously.

The characteristic concentration potential of protamine impregnated membranes prepared in accordance with the present example as well as their resistances when immersed in 0.1 molar KCl are shown in the table given below. The variations in resistance of the several membranes tabulated in Table IV are caused chiefly by slight variations in the humidity during drying. The resistances are given in ohms per membrane, the membranes being about 50 square centimeters active area. The measurement of the characteristic concentration potential and resistance are carried out in the manner described with reference to Example A.

TABLE IV

*Characteristic concentration potential and resistance of dried protamine collodion membranes*

| Membrane | Characteristic concentration potential 0.1 M KCl/0.01 M KCl | Resistance in 0.1 M KCl solution ±0.5 ohms |
|---|---|---|
|  | mv. | Ohm per 50 sq. cm. |
| a | −52.9 | 10 |
| b | −53.0 | 12 |
| c | −52.5 | 14 |
| d | −53.0 | 12 |
| e | −52.8 | 10 |
| f | −53.0 | 5 |
| g | −53.0 | 2±0.2 |
| h | −52.8 | 0.5±0.2 |
| i | −53.0 | 0.5±0.2 |

A protamine impregnated membrane prepared in accordance with this example was tested for the rate of anion exchange through it. The membrane showed a characteristic concentration potential of 53 mv. and a resistance of 2 ohms in 0.1 molar KCl solution, was filled with 30 ml. of 0.1 molar $NH_4Cl$ solution and placed in 30 ml. of 0.1 molar $KNO_3$. After four hours 0.8 milli-equivalent of $Cl^-$ had exchanged through the membrane whereas only 0.025 of $NH_4^+$ had entered the $KNO_3$. This cation "leak" corresponds to 3.2%. With stirring the absolute rate of ion exchange increases several fold, but does not change the percentage of anion "leak." The leak of bivalent cations such as $CA^{++}$ or $BA^{++}$ of the electropositive membranes of this example is much smaller than for univalent cations.

The protamine impregnated membranes prepared in accordance with the present example are useful in the potentiometric determination of anions such as $Cl^-$, $Br^-$, $I^-$, $F^-$, $ClO_3^-$, $ClO_4$, $BrO_3^-$, $IO_3^-$, $NO_3^-$, and $Ac^-$. For the determination of several of these ions no other potentiometric method is known.

The adsorption method of imparting selectivity to the membranes, as exemplified by Example B, may also be used to make electronegative membranes by adsorbing acidic materials such as deaminated proteins or peptones on the membranes, followed by a shrinking treatment as described under Example B. Other adsorbable acidic high molecular weight compounds such as acidic proteins may be used. In place of protamine sulphate of Example B there may be used other protamine salts such as the corresponding chlorides, phosphates or the like. Likewise in place of protamine salts there may be used histones, basic peptones, proteoses and other basic high molecular weight substances. Artificial resins of either anionic or cationic character may likewise be used as adsorption materials. The value of any specific impregnating material depends upon the solutions with which it is used and upon how pronounced its electrical character is.

Where it is desired to provide membranes of low ohmic value and high absolute permeability but without pronounced ionic selectivity, the oxidizing step of Example A or impregnating step of Example B may be omitted. The membrane, after being cast, is then dried under controlled conditions, as heretofore stated.

Drying in air without support greatly increases the resistance of the membranes produced in accordance with the present invention, but the characteristic concentration potential which before shrinking is already near the maximum does not change significantly. Such drying may be regulated to increase the resistance as desired to any value up to about 1500 ohms per 50 square centimeters or even higher for the electronegative membranes and up to 100 ohms per 50 square centimeters for the electropositive membranes.

Likewise either the electropositive or electronegative membranes may be swelled after they have been removed from the mandrel by treatment with an appropriate swelling agent for the particular membrane material used. Thus, where the substance is composed of collodion, swelling may be accomplished for example by using solutions of ethyl alcohol, butyl alcohol, aldehydes or ethers. In general, swelling the membrane greatly increases the absolute permeability, while decreasing the ohmic resistance and characteristic concentration potential. These "swelled" membranes are more useful for handling larger sized or polyvalent ions, although at a somewhat reduced selectivity, as compared with the non-swelled small-pored membranes described in Examples A and B.

As many apparently widely different embodiments of this invention may be made without departing from the spirit and scope thereof, it is to be understood that we do not limit ourselves to the specific embodiments herein except as defined by the appended claims.

What we claim is:

1. The process of making an ionic selective permeable membrane having low ohmic value and high absolute permeability which comprises casting a thin layer of a thermoplastic film-forming cellulose compound on a forming mold, solidifying said layer of cellulose compound on said mold to form a permeable membrane, oxidizing said permeable cellulose membrane while still on the mold with an alkali metal caustic to form dissociable groups in the pores of said membrane, and thereafter drying the membrane and removing the membrane from said mold.

2. The process set forth in claim 1 characterized in that the thermoplastic film-forming cellulose compound is cellulose nitrate and the alkali metal caustic oxidizing agent is sodium hydroxide.

3. The process of making an ionic selective permeable membrane having low ohmic value and high absolute permeability which comprises casting a thin layer of a thermoplastic film-forming cellulose compound on a forming mold, solidifying said layer of cellulose compound on said mold to form a permeable membrane, oxidizing said permeable cellulose membrane while still on the mold with an alkali metal caustic to form dissociable groups in the pores of said membrane, impregnating said membrane with a solution of an inorganic acid salt of protamine and thereafter drying the membrane and removing the membrane from said mold.

4. The process as set forth in claim 3 characterized in that the cellulose compound is cellulose nitrate, the alkali metal caustic oxidizing agent is sodium hydroxide and the protamine salt is protamine sulphate.

KARL SOLLNER.
CHARLES W. CARR.
HARRY P. GREGOR.

REFERENCES CITED

The following references are of record in the file of this patent:

UNITED STATES PATENTS

| Number | Name | Date |
|---|---|---|
| 1,719,633 | Teague | July 2, 1929 |
| 1,864,244 | Henderson | June 21, 1932 |
| 1,945,933 | Chilowsky et al. | Feb. 6, 1934 |
| 1,962,327 | Reid | June 12, 1934 |
| 2,115,044 | Scott | Apr. 26, 1938 |
| 2,339,885 | Schmid | Jan. 25, 1944 |

FOREIGN PATENTS

| Number | Country | Date |
|---|---|---|
| 342,621 | Germany | Sept. 10, 1918 |
| 401,355 | France | Aug. 27, 1909 |

OTHER REFERENCES

Abrams & Sollner J. Gen. Physic, Mar. 20, 1943, pages 369 to 79. (Copy in Dept. of Agri. Lab.)